United States Patent
Butts et al.

(10) Patent No.: US 10,104,280 B2
(45) Date of Patent: Oct. 16, 2018

(54) CONTROLLING A CAMERA USING A VOICE COMMAND AND IMAGE RECOGNITION

(71) Applicant: International Business Machines Corporation, Armonk, NY (US)

(72) Inventors: Deborah J. Butts, Whiteley (GB); Adrian P. Kyte, Broadstone (GB); Timothy A. Moran, Southampton (GB); John D. Taylor, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/260,791

(22) Filed: Sep. 9, 2016

(65) Prior Publication Data
US 2017/0374266 A1    Dec. 28, 2017

Related U.S. Application Data

(63) Continuation of application No. 15/189,469, filed on Jun. 22, 2016.

(51) Int. Cl.
*H04N 5/232*        (2006.01)

(52) U.S. Cl.
CPC ............................. *H04N 5/23216* (2013.01)

(58) Field of Classification Search
None
See application file for complete search history.

(56) References Cited

U.S. PATENT DOCUMENTS

| 8,207,936 | B2 | 6/2012 | Gustafsson et al. |
| 2011/0099476 | A1* | 4/2011 | Snook ..................... G06F 3/011 715/728 |
| 2011/0251768 | A1* | 10/2011 | Luo ....................... B60W 30/12 701/70 |
| 2012/0001934 | A1* | 1/2012 | Bala ...................... G06T 11/001 345/594 |
| 2013/0124207 | A1 | 5/2013 | Sarin et al. |
| 2013/0194438 | A1* | 8/2013 | Sweet, III .......... G06K 9/00221 348/207.1 |
| 2015/0156392 | A1 | 6/2015 | Konicek |
| 2015/0220777 | A1 | 8/2015 | Kauffmann et al. |
| 2015/0269420 | A1* | 9/2015 | Kim ........................ G06F 21/32 382/118 |

(Continued)

FOREIGN PATENT DOCUMENTS

WO        2015105694 A1    7/2015

OTHER PUBLICATIONS

U.S. Appl. No. 15/189,469, "Controlling a Camera Using a Voice Command and Image Recognition", filed Jun. 22, 2016.

(Continued)

*Primary Examiner* — Justin P. Misleh
(74) *Attorney, Agent, or Firm* — Edward P. Li

(57) ABSTRACT

A method, a computer program product, and a computer system for controlling a camera using a voice command and image recognition. One or more processors on the camera captures the voice command that is from a user of the camera and declares a subject of interest. The one or more processors processes the voice command and sets the subject of interest. The one or more processors receives a camera image from an imaging system of the camera. The one or more processors identifies the subject of interest in the camera image. The one or more processors sets camera one or more parameters that are appropriate to the subject of interest.

10 Claims, 3 Drawing Sheets

(56) References Cited

U.S. PATENT DOCUMENTS

| | | | | |
|---|---|---|---|---|
| 2016/0142613 A1* | 5/2016 | Brav | ................. | H04N 5/23206 |
| | | | | 348/211.3 |
| 2016/0182814 A1* | 6/2016 | Schwesinger | .......... | H04N 7/147 |
| | | | | 348/14.03 |
| 2016/0259977 A1* | 9/2016 | Asbun | .................... | A61B 5/165 |
| 2017/0041523 A1* | 2/2017 | Rifkin | .................... | G10L 15/26 |
| 2017/0109891 A1* | 4/2017 | Mosher | .................... | G06T 1/20 |
| 2017/0127008 A1* | 5/2017 | Kankaanpaa | ........ | H04N 5/4403 |
| 2017/0195549 A1* | 7/2017 | Cao | .................... | H04N 5/23212 |

OTHER PUBLICATIONS

Appendix P.: List of IBM Patents or Patent Applications to be Treated as Related, Sep. 9, 2016, 2 pages.

Paul, I. "Android gets voice-activated camera functionality, smarter keyboard" Greenbot. Mar. 20, 2014. <https://web.archive.org/web/20151012070601/http://www.greenbot.com/article/2109944/android-gets-voice-activated-camera-functionality-smarter-keyboard.htm>. Two pages.

"Lightweigh eye tracker". Internet Archive WayBack Machine. Jul. 2, 2013. <http://web.archive.org/web/20130702125634/http://hackaday.com/2006/01/13/lightweight-eye-tracker/>. Twelve pages.

"Face detection". Wikipedia. Jan. 26, 2015. <https://en.wikipedia.org/w/index.php?title=Face_detection&oldid=644219159>. Three pages.

Eliot. "Lightweight Eye Tracker" Hackaday, Atmel Studio 7. Jan. 13, 2006. Six pages.

Tolios. "Why did Canon stop using their eye tracking focus system?" May 14, 2015. One page.

Zhang. "Rumor: Sony May Introduce Eye-Tracking Focus Next Year". Jan. 18, 2013. Two pages.

* cited by examiner

CONTROLLING A CAMERA USING A VOICE COMMAND AND IMAGE RECOGNITION

BACKGROUND

The present invention relates generally to image processing of a camera, and more particularly to combination of a voice command and image recognition to provide a mechanism for identifying a subject of interest within a photo or a video image frame.

When using a camera, often it is frustrating that the camera does not recognize what is a subject of interest in a photo or video frame. This situation may cause issues when attempting to set parameters such as focusing, zoom, and exposure. Also, where cameras have the ability to rotate and pan, keeping a subject of interest in the frame can be difficult.

With facial recognition, a camera can locate a face within a photo or video image frame and then make the face a subject of interest. To a certain extent, the facial recognition works with a face within the frame but does not work for a subject other than a face or multiple faces in the frame. Face detection provides a means to identify faces in image frames. This is valuable so long as a user of a camera is interested in a face or faces identified by the camera. If a subject of interest is not a face or there are multiple faces and the user of the camera is interested in one in particular, then facial recognition does not serve to identify a subject of interest.

Websites such as Facebook and Google have technology of facial identification in photos to identify faces within a photo. Although facial identification can be done for a video or photo image, this technique itself does not provide a mechanism for identifying the subject of interest while using a camera.

It can be possible to use a touch screen to identify a subject of interest in a photo or video image frame. However, the screen sizes on many devices and the difficulty of viewing in the bright sunlight can make it tricky to identify a subject of interest. Additionally, with touch screens, it is difficult to select a distant subject when it is partially occluded by a closer subject.

SUMMARY

In one aspect, a method for controlling a camera using a voice command and image recognition is provided. The method is implemented by one or more processors on the camera. The method includes capturing the voice command that is from a user of the camera and declares a subject of interest. The method further includes processing the voice command and setting the subject of interest. The method further includes receiving a camera image from an imaging system of the camera. The method further includes identifying the subject of interest in the camera image. The method further includes setting one or more camera parameters that are appropriate to the subject of interest.

In another aspect, a computer program product for controlling a camera using a voice command and image recognition is provided. The computer program product comprises a computer readable storage medium having program code embodied therewith. The program code executable to: capture the voice command that is from a user of the camera and declares a subject of interest; process the voice command; set the subject of interest; receive a camera image from an imaging system of the camera; identify the subject of interest in the camera image; and set one or more camera parameters that are appropriate to the subject of interest.

In yet another aspect, a computer system for controlling a camera using a voice command and image recognition is provided. The computer system comprises one or more processors, one or more computer readable tangible storage devices, and program instructions stored on at least one of the one or more computer readable tangible storage devices for execution by at least one of the one or more processors. The program instructions are executable to capture the voice command that is from a user of the camera and declares a subject of interest. The program instructions are executable to process the voice command and set the subject of interest. The program instructions are executable to receive a camera image from an imaging system of the camera. The program instructions are executable to identify the subject of interest in the camera image. The program instructions are executable to set one or more camera parameters that are appropriate to the subject of interest.

DETAILED DESCRIPTION

Figure 1:
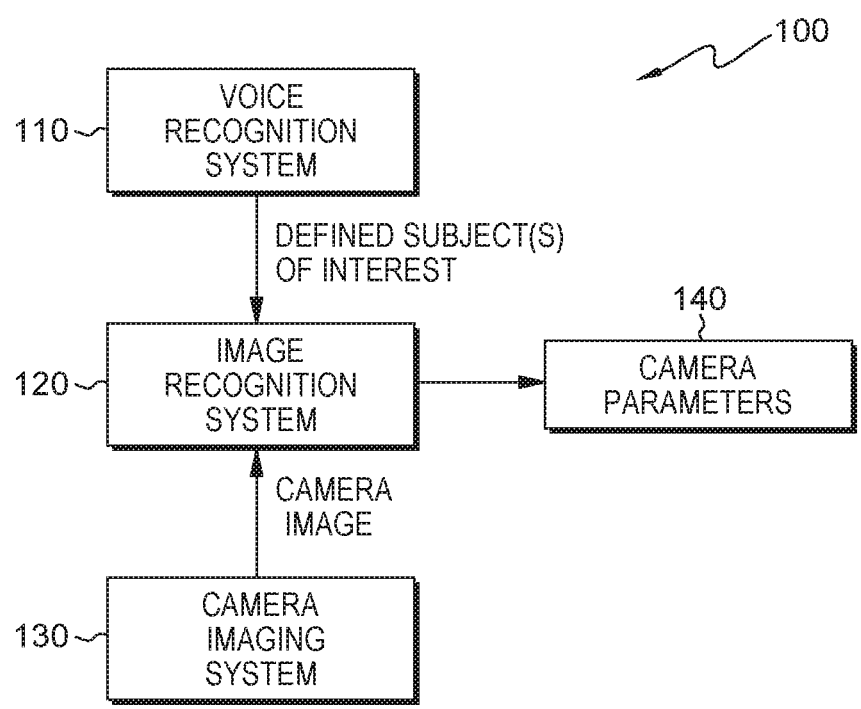
FIG. 1 is a diagram illustrating a system for controlling a camera using a voice command and image recognition, in accordance with one embodiment of the present invention.

Embodiments of the present invention provide a simple and effective mechanism to select and set a subject of interest in a photo or video frame. The mechanism disclosed in the embodiments of the present invention can be used for both photographic and video instruments. The mechanism can be implemented for any device that takes photographs or video recordings, including cameras and video cameras. For example, the mechanism can be implemented in a mobile phone such as a smart phone. For the sake of simplicity, the term of "camera" is used in the document and the term of "camera" refers to any device that takes photographs or video recordings.

In the embodiments of the present invention, a user of a camera simply states what the user wants to make a subject of interest for the camera, and the camera uses image recognition to identify the subject of interest within a photo or video frame; the subject of interest is used for setting focus, exposure, zoom, pan, or tilt. The voice input from the user provides a simpler and less fiddly interface. For example, there are a group of people and a car or a house in the photo or video frame, a camera with face identification may focus on the group of people in the foreground; however, a photographer is interested in the car or the house. In this example, with the mechanism disclosed in the embodiments of the present invention, the photographer says to the camera "subject car" or "subject house", the camera then uses image recognition to identify the car or the house; thus, the car or the house becomes the subject of interest for setting focus, exposure, or pan tilt tracking. One of advantages of the mechanism in the embodiments of the present invention is that a non-human subject can be made a subject of interest.

The embodiments of the present invention combine a voice command and image recognition to provide a mechanism for identifying a subject of interest within a photo or video image frame. A person using a camera can simply say what subject the person is interested in. Image recognition is then used to identify the subject of interest within the camera frame. With the subject of interest identified, camera parameters, such as focus, exposure, and pan or tilt in a rotatable camera system, can be set such that the parameters are appropriate to the subject of interest. For example, the person says to the camera "subject car", parameters such as exposure will be fixed or changed based on the selected subject of interest—the car. It should be possible to state actions at the same time or separately to identifying the subject of interest.

In the embodiments of the present invention, a voice command may use any feature of a subject to differentiate it from other subjects in a photo or video frame of a camera. For example, a voice command of "focus on the red car" or a voice command simply stating "focus on red" can differentiate a red subject in a photo or video frame from other subjects. A voice command may use comparative statements, such as "focus on person on the right (of frame)" or "focus on the tallest person".

In the embodiments of the present invention, a subject of interest may be set for multiple photos. For example, at an air show, a voice command of "focus on aircraft" can be followed by some means of locking this in; the locking in can be implemented by a voice command or some forms of interaction with the camera such as pressing a button. In this example, if the voice command of "focus on aircraft" is locked in at an airshow, any aircraft will be identified as a subject of interest; in a case where a first aircraft leaves the frame and a second aircraft entered the frame, the first aircraft is identified as a subject of interest before it leaves the frame, and the second aircraft is identified as a subject of interest after the first aircraft leaves the frame and the second aircraft entered the frame.

In the embodiments of the present invention, a voice command may be used in conjunction with image processing to identify a subject of interest within a photo or video frame, the identified subject of interest on a display of a camera is highlighted. The camera may also optionally make an audible alert when the subject of interest is identified in the frame.

In the embodiments of the present invention, for a camera with facial recognition, a voice command is used in conjunction with facial recognition. For example, a camera user may give a voice command requiring the camera to focus on a specific person, then the camera will focus on the specific person.

In the embodiments of the present invention, the camera can also be pre-primed with a voice command before a subject of interest appears in a photo or video frame. A camera user gives a voice command requiring the camera to focus on a specific subject before it is in the frame. The image processing will search the specific subject until it appears in the frame, then the specific subject becomes identified as the subject of interest.

In the embodiments of the present invention, a voice command may declare multiple subjects of interest, thus parameters such as exposure and focus are set based on all the subjects of interest. When one of the multiple subjects of interest is in the frame, the multiple subjects of interest becomes identified. For example, a camera user gives a voice command to declare person A and person B as the multiple subjects of interest; when either person A or person B is in the frame, they become identified.

In another embodiment, a voice command may directly request a camera to take a picture or a video of a subject. Upon receiving the voice command of taking a picture or video, the camera sets parameters that are appropriate to the subject and then takes a photo or video, without further control input (either a further voice command or a manual button press) from a user of the camera. For example, a user of a camera may say to the camera "take a picture of a car" or "take a video of a car"; the camera sets parameters appropriate to the car and then takes a picture or a video of the car; under this situation no further user's input is needed. In yet another embodiment, the voice command of taking a picture or video of a subject may pre-prime a camera. The voice command of taking a picture or video of a subject is given to the camera while the subject is not in the frame of the camera; when the subject enters the frame, the camera sets appropriate parameters and then takes the picture or video of the subject.

FIG. 1 is a diagram illustrating system 100 for controlling a camera using a voice command and image recognition, in accordance with one embodiment of the present invention. System 100 on a camera comprises voice recognition system 110. Voice recognition system 110 captures a voice command; the voice command is from a user of a camera and declares a subject of interest. System 100 in the camera further comprises image recognition system 120 and camera imaging system 130. Image recognition system 120 receives a camera image from camera imaging system 130 and identifies the subject of interest on the camera image. Image recognition system 120 sets camera parameters 140, such as focus, exposure, and pan or tilt in a rotatable camera system, such that parameters 140 are appropriate to the subject of interest.

Figure 2:
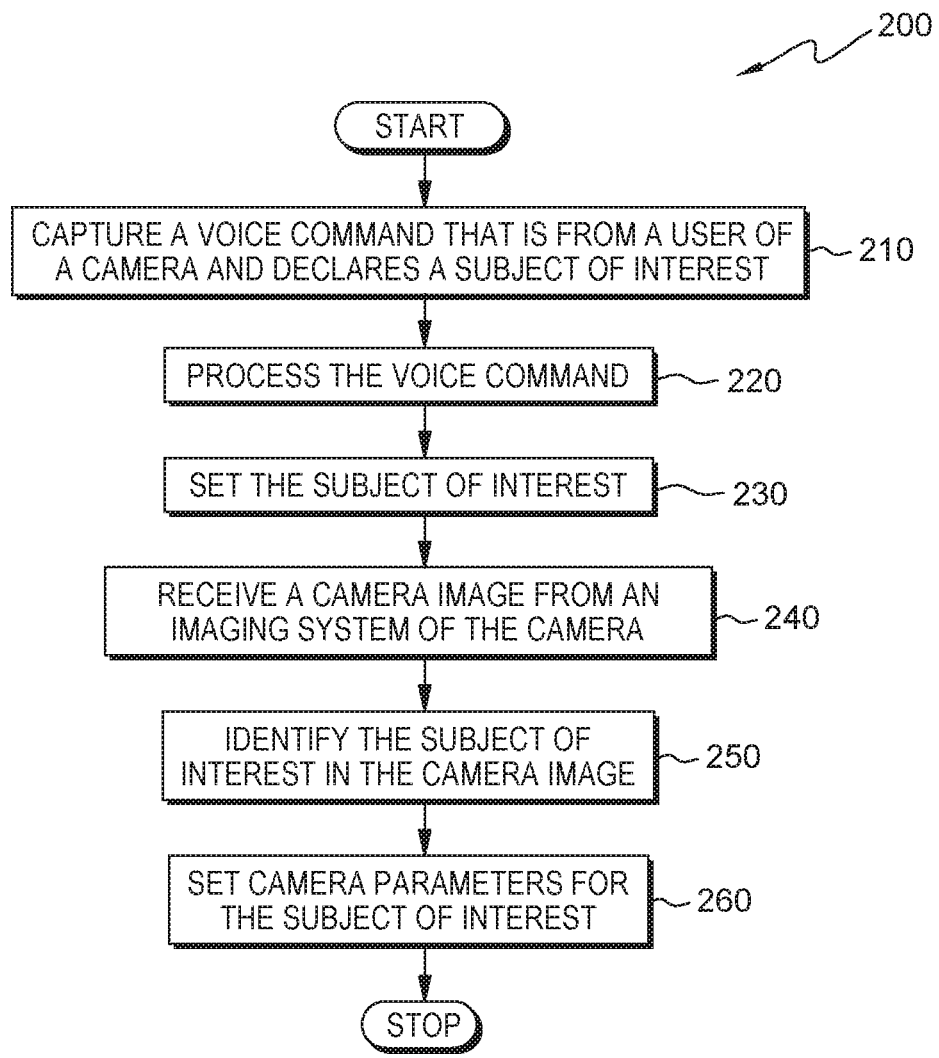
FIG. 2 is a flowchart showing operational steps for controlling a camera using a voice command and image recognition, in accordance with one embodiment of the present invention.

FIG. 2 is a flowchart showing operational steps 200 for controlling a camera using a voice command and image recognition, in accordance with one embodiment of the present invention. At step 210, voice recognition system 110 captures a voice command that is from a user of a camera and declares a subject of interest. At step 220, voice recognition system 110 processes the voice command. At step 230, voice recognition system 110 sets the subject of interest. At this step, voice recognition system 110 defines the subject of interest. At step 240, image recognition system 120 receives a camera image from imaging system 130. At step 250, image recognition system 120 identifies the subject of interest in the camera image. At step 260, image recognition system 120 sets camera parameters 140 that are appropriate to the subject of interest. For example, the camera parameters 140 may include focus, exposure, and pan or tilt in a rotatable camera system.

Figure 3:
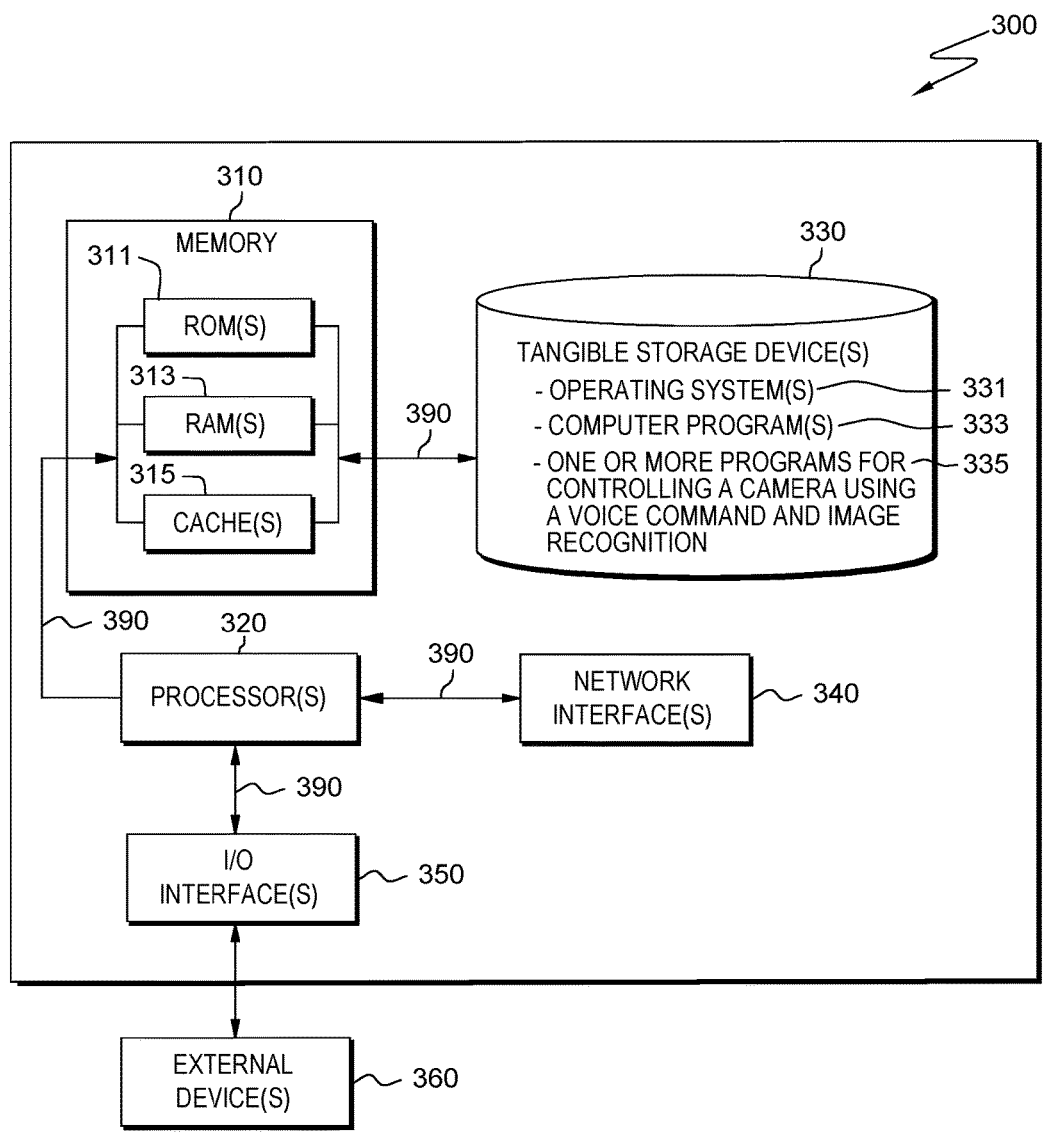
FIG. 3 is a diagram illustrating components of a computer system on a camera, in accordance with one embodiment of the present invention.

FIG. 3 is a diagram illustrating components of computer system 300 on a camera, in accordance with one embodiment of the present invention. Computer system 300 hosts system 100 (shown in FIG. 1) for controlling a camera using a voice command and image recognition. It should be appreciated that FIG. 3 provides only an illustration of one implementation and does not imply any limitations with regard to the environment in which different embodiments may be implemented.

Referring to FIG. 3, computer system 300 on a camera includes processor(s) 320, memory 310, and tangible storage device(s) 330. In FIG. 3, communications among the above-mentioned components of device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. One or more computer programs 333 include one or more programs 335 for controlling a camera using a voice command and image recognition. Device 300 further includes I/O interface(s) 350. I/O interface(s) 350 allows for input and output of data with external device(s) 360 that may be connected to device 300. Device 300 further includes network interface(s) 340 for communications between device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A tangible storage device having computer readable program instructions thereon for causing a processor to:
   capture the voice command from a user of the camera, the voice command from a user of the camera, the voice command declaring a subject of interest, wherein the voice command uses a comparative statement stating at least one of a color, a location, and a stature of the subject of interest;
   process the voice command declaring the subject of interest;
   set the subject of interest in a frame of the camera, according to the voice command declaring the subject of interest;
   highlight the subject of interest when the subject of interest is in the frame;
   make an audible alert when the subject of interest is in the frame;
   receive a camera image from an imaging system of the camera;
   identify in the camera image the subject of interest defined by the voice command declaring the subject of interest;
   capture, by the one or more processors, a second voice command from the user of the camera, the second voice command locking in the subject of interest, the locking in the subject of interest identifies a second object as the subject of interest when a first object that has been identified as the subject of interest leaves the frame of the camera; and
   set at least one of camera parameters of focus, exposure, pan, and tilt such that the at least one of the camera parameters are appropriate to the subject of interest defined by the voice command declaring the subject of interest.

2. The tangible storage device of claim 1, wherein the voice command declaring the subject of interest uses a feature of the subject of interest to differentiate the subject of interest defined by the voice command declaring the subject of interest from other subjects in the camera image.

3. The tangible storage device of claim 1, wherein the subject of interest defined by the voice command declaring the subject of interest is set for multiple camera images.

4. The tangible storage device of claim 1, wherein the voice command declaring the subject of interest pre-primes the camera before the subject of interest defined by the voice command declaring the subject of interest appears in the camera image.

5. The tangible storage device of claim 1, wherein the voice command declaring the subject of interest declares multiple subjects of interest, wherein the at least one of camera parameters of focus, exposure, pan, and tilt are set to be appropriate to the multiple subjects of interest.

6. A computer system for controlling a camera using a voice command and image recognition, the computer system comprising:
   one or more processors, one or more computer readable tangible storage devices, and program instructions stored on at least one of the one or more computer readable tangible storage devices for execution by at least one of the one or more processors, the program instructions executable to:
   capture the voice command from a user of the camera, the voice command from a user of the camera, the voice command declaring a subject of interest, wherein the voice command uses a comparative statement stating at least one of a color, a location, and a stature of the subject of interest;
   process the voice command declaring the subject of interest;
   set the subject of interest in a frame of the camera, according to the voice command declaring the subject of interest;
   highlight the subject of interest when the subject of interest is in the frame;
   make an audible alert when the subject of interest is in the frame;
   receive a camera image from an imaging system of the camera;
   capture, by the one or more processors, a second voice command from the user of the camera, the second voice command locking in the subject of interest, the locking in the subject of interest identifies a second object as the subject of interest when a first object that has been identified as the subject of interest leaves the frame of the camera; and
   set at least one of camera parameters of focus, exposure, pan, and tilt such that the at least one of the camera parameters are appropriate to the subject of interest defined by the voice command declaring the subject of interest.

7. The computer system of claim 6, wherein the voice command declaring the subject of interest uses a feature of the subject of interest to differentiate the subject of interest defined by the voice command declaring the subject of interest from other subjects in the camera image.

8. The computer system of claim 6, wherein the subject of interest defined by the voice command declaring the subject of interest is set for multiple camera images.

9. The computer system of claim 6, wherein the voice command declaring the subject of interest pre-primes the camera before the subject of interest defined by the voice command declaring the subject of interest appears in the camera image.

10. The computer system of claim 6, wherein the voice command declaring the subject of interest declares multiple subjects of interest, wherein the at least one of camera parameters of focus, exposure, pan, and tilt are set to be appropriate to the multiple subjects of interest.

* * * * *